Jan. 28, 1958  R. F. THOM  2,821,411
PIPE COUPLINGS
Filed March 15, 1956
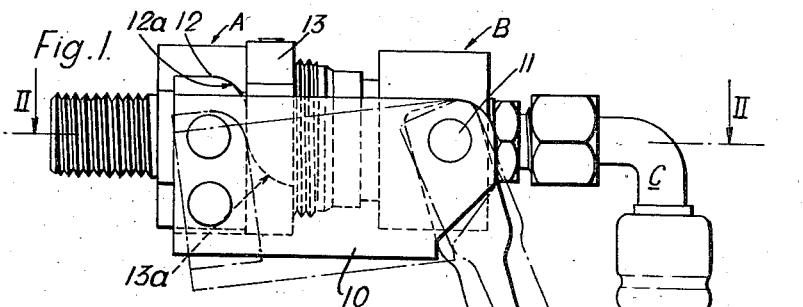
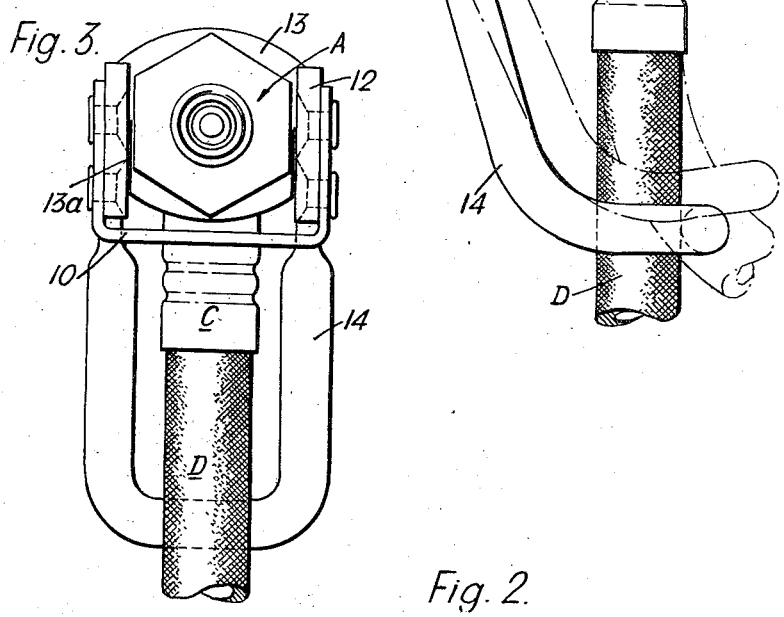
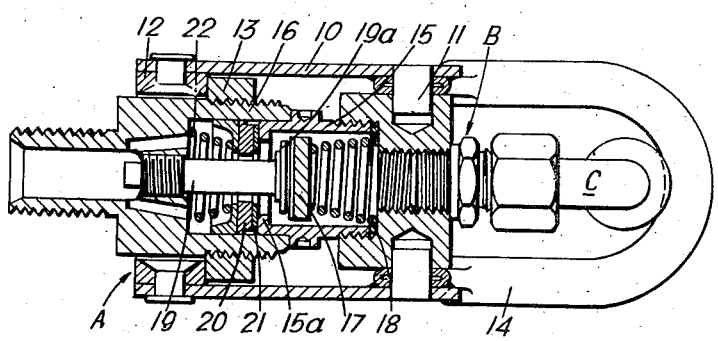
Inventor:
Royston Frances Thom
By: Baldwin & Wight
Attorneys

United States Patent Office 2,821,411
Patented Jan. 28, 1958

2,821,411
PIPE COUPLINGS

Royston F. Thom, Edgware, England, assignor to Exactor Limited, Edgware, England Application March 15, 1956, Serial No. 571,629

Claims priority, application Great Britain March 16, 1955

4 Claims. (Cl. 284—16)

This invention relates to couplings for pipes; more particularly the invention relates to couplings of the quick release type by which complementary end fittings on the ends of the pipes can be quickly moved together and held to establish a flow connection and quickly released to break the flow connection.

This action is achieved by providing an abutment on one end fitting and a latch member pivotally mounted on the other end fitting so that by swinging the latch member over the abutment the end fittings are drawn together.

According to one feature of the invention, at least one end fitting is provided with a self-closing valve which is automatically opened when the complementary end fitting is presented to it, and the latch member has a camming surface of substantial length so that on swinging the latch member in one direction an easy camming action is set up on the abutment to draw the end fittings together and to cause the self-closing valve (or valves) to open.

It is preferred in accordance with another feature of the invention to provide both the latch member and the abutment with similar camming surfaces of substantial lengths which are arranged to engage when the latch member is swung in one direction.

The latch member, on being swung in the opposite direction can be moved clear of the abutment to enable the end fittings to part and again this action can be effected easily and quickly; this release action can be carried out by an operator; where the invention is applied to a coupling for pipes, one at least of which is flexible, carried by two relatively movable parts (e. g. a tractor and an agricultural implement having a hydraulically operated component to be operated by hydraulic transmission through the coupled pipes from the tractor) the latch member can be arranged for automatic release operation by relative parting movement of the two parts.

This automatic release may be effected by a strainer wire or rod connected to the latch member but in accordance with a further feature of the invention, it is preferred to employ releasing means arranged for engagement by the flexible pipe and adapted to cause the latch member to swing clear of the abutment should the flexible pipe tend to be moved from its normal position by relative parting movement of the two parts.

In order that the invention may be more fully and clearly understood, an embodiment thereof will now be described with reference to the accompanying drawing in which:

Figure 1 is a side view of a pipe coupling constructed in accordance with the invention;

Figure 2 is a sectional plan view taken on the line II—II of Figure 1; and

Figure 3 is an end view taken from the left of Figure 1.

Referring to the drawing, the pipe coupling assembly comprises two end fittings or coupling members indicated generally as A and B, for the pipes to be connected. Fitting B is attached by means of a right angle joint C to a flexible pipe or hose D which extends from a tractor, say, towing an agricultural implement. The other pipe (not shown) from the implement is connected to a fitting A and may be flexible or rigid, but in any event fitting A must not be movable relative to the implement. The flexible conduit extension D normally hangs down in substantially fixed positional relation to the coupling member B, but should the tractor and implement move farther apart than normal the hose will take up a position such as that shown in chain-dotted lines in Figure 1. As will be explained hereinafter, such movement of the hose results in automatic release of the coupling, so that no strain is put on the pipes and coupling due for example to the implement becoming unhitched from the tractor.

Fitting B is provided with a coupling and locking element formed as a latch member 10 of channel section, the sides of which constitute arms pivotally mounted on stub pins 11 secured to fitting B at opposite ends of a transverse axis thereof, the element 10 being rockable purely arcuately about the axis of the pins 11 fixed with respect to the coupling member B. Projections 12 are riveted at the free end of the latch member 10 to the inner faces of the sides of that member. Each projection 12 is formed with a rounded camming surface 12a (see Figure 1) facing the pivoted end of the latch member.

The fitting A is provided with an abutment in the form of a collar 13 secured thereto, for cooperation with the latch member to hold the fittings together. The collar 13 is shaped so as to provide on either side thereof a rounded camming surface 13a generally similar to and facing respective ones of the camming surfaces 12a.

In order to couple the fittings, they are loosely fitted together and the latch member 10 is swung up in clockwise direction until the curved portions of camming surfaces 12a and 13a engage. Thereafter, an easy camming action draws the end fittings together as the latch member is passed over the abutment. Finally, the straight or substantially flat dwell portions of camming surfaces 12a and 13a will be in engagement so that the end fittings are firmly coupled and locked together.

Automatic release of the coupling is effected by means of a member 14 which comprises a tube bent to form a loop and with flattened ends soldered to the arms of the latch member 10 adjacent pivot pins 11. Thus, the release member 14 pivots with the latch member and when the coupling is locked by the latch member, member 14 hooks round the normally vertical portion of hose D. As can be seen in Figure 1, the sides of the loop are cranked so that the hose engaging part is at right angles to the length of the hose and is adjacent to the hose. If for any reason the tractor parts from the implement, the hose moves into the position shown in chain-dotted lines (Figure 1) causing release member 14 and consequently latch member 10 to pivot to the positions shown in chain-dotted lines. Release of the latch member from the abutment is completed by the former swinging down under its own weight. Any force tending to pull the fittings apart assists the movement of the latch member through the engaged curved camming surfaces 12a and 13a.

Each fitting is formed with a fluid flow passage and is provided with a self-closing valve which is opened by the other fitting as the fittings are drawn together. The actual arrangement of such valves does not form part of the present invention, but one possible construction is shown in Figure 2. Fitting B has a spigot portion 15 adapted to enter and mate with the socket portion 16 of fitting A. The spigot 15 is in the form of a sleeve with an inwardly directed annular rim 15a at its forward end. This rim serves as a seating for a valve member 17 arranged within the sleeve 15 and loaded by a spring 18 so that in the unconnected fitting it is held against its seating and seals the fitting B.

A pillar 19 is arranged centrally in the socket 16 of fitting A and the forward end has a flange 19a which constitutes a seating for a valve member 20. The valve member 20 has a resilient washer 21 on its forward face and is urged forward by a spring 22 so that it engages flange 19a when the fitting A is unconnected and thereby seals that fitting.

When the aligned fittings are drawn together, spigot 15 enters socket 16 and thereby displaces valve 20 against the action of spring 22 so as to open that valve. At the same time, pillar 19 enters the spigot 15 and displaces valve member 17 against the action of its spring 18 so that that valve is also opened.

It will be appreciated that various modifications can be made without departing from the scope of the invention which is not limited to the particular arrangement described and shown in the drawing. For example, the right angle joint C can be omitted and the coupling and the portion of hose D attached thereto arranged vertically. In this case, the sides of the release member 14 are not cranked and it extends in line with the coupling, the automatic release functioning in the same way as previously described.

I claim:

1. In a detachable pipe coupling assembly, two coupling members both having fluid flow passages and being provided with mutually mating portions disconnectably engageable with each other for enabling flow of fluid from one member to the other member; a coupling and locking element formed with a first cam; means on one of said coupling members pivoting said coupling and locking element to rock purely arcuately about an axis fixed with respect to said one of said coupling members; an abutment on the other of said coupling members formed with a second cam cooperable with said first cam upon rocking of said coupling and locking element for drawing said coupling members into mating engagement; a valve in one of said coupling members biased toward closed position; and means on the other of said coupling members engageable with said valve for opening the latter in response to movement of said coupling members relatively into coupling engagement.

2. A detachable pipe coupling assembly construction as set forth in claim 1 in which said one of said cams has a rounded surface engageable with the other of said cams for forcibly drawing said coupling members together in response to rocking of said coupling and locking element, and also a relatively flat dwell portion extending from said rounded surface and being engageable with said other of said cams for holding said coupling members locked in coupled relation.

3. A detachable pipe coupling assembly construction as set forth in claim 2 in which each of said cams is formed with a rounded surface and with a relatively flat dwell portion, the rounded surfaces of said cams being engageable with each other for forcibly drawing said coupling members together, and the dwell portions of said cams being engageable with each other for holding said coupling members locked in coupled relation.

4. In a detachable pipe coupling assembly, two coupling members both having fluid flow passages and being provided with mutually mating portions disconnectably engageable with each other for enabling flow of fluid from one member to the other member; a flexible conduit extension connected to one of said coupling members and normally extending therefrom in substantially fixed positional relation thereto but being displaceable from such positional relation; a coupling and locking element formed with a first cam; means on said one of said coupling members pivoting said coupling and locking element to rock purely arcuately about an axis fixed with respect to said one of said coupling members; an abutment on the other of said coupling members formed with a second cam cooperable with said first cam upon rocking of said coupling and locking element for drawing said coupling members into mating engagement, said coupling and locking element having a part disposed adjacent to said flexible conduit extension when the latter is in its normal positional relation to said one of said coupling members and said coupling and locking element is in its coupling locking position, said part being operable by said flexible conduit extension when the latter is moved from its normal positional relation to said one of said coupling members for rocking said coupling and locking element reversely to permit disengagement of said coupling members from each other; a valve in one of said coupling members biased toward closed position; and means on the other of said coupling members engageable with said valve for opening the latter in response to movement of said coupling members relatively into coupling engagement.

References Cited in the file of this patent
UNITED STATES PATENTS 1,993,167    Harts                 Mar. 5, 1935
2,662,784    Livers                Dec. 15, 1953